United States Patent
Eckelkamp-Baker et al.

(10) Patent No.: US 6,653,611 B2
(45) Date of Patent: Nov. 25, 2003

(54) OPTICAL LINE OF SIGHT POINTING AND STABILIZATION SYSTEM

(75) Inventors: Dan Eckelkamp-Baker, Rio Rancho, NM (US); Henry R. Sebesta, Albuquerque, NM (US)

(73) Assignee: A-Tech Corporation, Albuquerque, NM (US)

( * ) Notice: Subject to any disclaimer, the term of this patent is extended or adjusted under 35 U.S.C. 154(b) by 0 days.

(21) Appl. No.: 09/828,483

(22) Filed: Apr. 9, 2001

(65) Prior Publication Data

US 2002/0145102 A1 Oct. 10, 2002

(51) Int. Cl.[7] .................................................. G01J 1/20
(52) U.S. Cl. ...................... 250/201.1; 250/234; 356/138
(58) Field of Search .............................. 250/201.1, 234, 250/206, 206.1, 235; 396/54, 55; 359/554–557, 401; 356/138, 145

(56) References Cited

U.S. PATENT DOCUMENTS

| | | | |
|---|---|---|---|
| 4,315,610 A | | 2/1982 | Malueg |
| 4,349,838 A | * | 9/1982 | Daniel .......................... 33/286 |
| 4,385,834 A | * | 5/1983 | Maxwell, Jr. ................ 356/153 |
| 4,498,038 A | | 2/1985 | Malueg |
| 4,701,602 A | * | 10/1987 | Schaefer et al. .......... 250/201.1 |
| 5,054,917 A | * | 10/1991 | Pepin et al. ............. 250/203.2 |
| 5,075,861 A | | 12/1991 | Hasson et al. |
| 5,170,104 A | | 12/1992 | Laughlin |
| 5,793,541 A | | 8/1998 | Cattan et al. |
| 5,815,302 A | | 9/1998 | Mc Vey et al. |
| 5,948,044 A | | 9/1999 | Varley et al. |
| 6,288,381 B1 | * | 9/2001 | Messina ................... 250/201.1 |

OTHER PUBLICATIONS

Luniewicz, M.F., et al., "Comparison of Wide–Band Inertial Line of Sight Stabilization Reference Mechanizations, " *Proceedings of SPIE International Symposium on Aerospace/Defense Sensing* ( *Conference 1697*) —Acquisition, Tracking, and Pointing VI, Abstract, 1992 Nov.

* cited by examiner

Primary Examiner—Kevin Pyo
Assistant Examiner—Seung C. Sohn
(74) Attorney, Agent, or Firm—Connolly, Bove, Lodge & Hutz LLP

(57) ABSTRACT

A system for stabilizing an optical line of sight. An optical system including primary optics and relay optics includes a jitter rejection mirror located within the path of the relay optics. An auto alignment system is provided for maintaining alignment of the jitter rejection mirror in response to a control signal. An auto alignment sensor detects jitter in a reference beam passing through the jitter rejection mirror, and the generated control signal is used to reduce the jitter. The reference beam is supplied by a stabilized source of laser signals which are received by the primary optics, and relayed to the jitter rejection mirror.

10 Claims, 7 Drawing Sheets

OPTICAL LINE OF SIGHT POINTING AND STABILIZATION SYSTEM

BACKGROUND OF THE INVENTION

The present invention relates to a system for pointing and stabilizing an optical axis of an optical system. Specifically, a system is provided which permits correction of jitter in an optical system using a separate reference laser beam.

Optical imaging systems and lasing systems are available to provide a magnified image for viewing, and/or for projecting a precision laser for illuminating a distant target. These systems have an optical axis (bore sight) which is positionable in elevation and azimuth. The optical system is susceptible to vibrational forces which tend to impose a jitter on any optical signal being processed by the system. This substantially random motion of the optical system axis produces blurring of an image being magnified by the system. In the case of a lasing system, the motion imparted to the laser disturbs its pointing direction.

These vibrational influences can be minimized by stabilizing the platform supporting the optical system. The platform supporting the positionable optical system, such as the tripod of a camera or the robotic arm of a surgical laser, have stabilization systems which detect vibrational displacements of the platform, and attempt to apply a counterforce to the platform to oppose the vibrational displacements. However, there are certain performance limitations in this approach. For instance, high performance optical systems, having many optical elements, may have individual elements being disposed with different levels with respect to each other due to the vibrational forces resulting in vibration of the optical axis of the system.

Optical systems, therefore, have an additional requirement that not only is the platform supporting the system stabilized, but that the optical axis lying along the optical axis or optical line of sight be stable, so that images viewed from the system are stable, as well as maintaining the pointing position of any laser transmission system stable vis-a-vis the optical line of sight. The present invention is directed to maintaining the stability of the optical line of sight in a multi-element optical system.

In order to keep the optical line of sight stable, an inertial reference must be provided which identifies any apparent motion in the line of sight and which is corrected. In space applications, a star is commonly used as an optical inertial reference because there is no apparent motion relative to the Earth. A star, however, does not work as an inertial reference inside the Earth's atmosphere because the atmosphere moves, and, therefore, anything viewed through the atmosphere tends to move.

Accordingly, in order to create the inertial reference and use it to maintain the pointing attitude stability of the optical line of sight, the present invention has been provided.

SUMMARY OF THE INVENTION

The present invention provides a system for pointing and stabilizing an optical line of sight in an optical system. The optical system includes a set of primary optics and relay optics which can be used to magnify an image received on one end thereof, or to transmit a laser to a precise location. A jitter rejection mirror is located in the path of the optical system, preferably near the point at which an image is viewed, or in which a laser originates in a laser pointing system. The jitter rejection mirror is positionable in response to an error signal generated by detecting a misalignment due to jitter between the optical system bore axis and a reference axis. The mirror is displaced in a direction to oppose any apparent change in the optical bore sight due to jitter.

In carrying out the invention in accordance with a preferred embodiment, changes in an inertially stable reference laser beam originating at the object side of the optical system is detected by an auto alignment sensor at the opposite end of the optical system. Jitter imposed on the optical system displaces the reference laser signal which is detected by the auto alignment sensor to generate a correction signal to position the jitter rejection mirror in a direction to cancel the jitter.

BRIEF DESCRIPTION OF THE DRAWINGS

The above-mentioned objects and advantages of the present invention will be more clearly understood when considered in conjunction with the accompanying drawings, in which.

DETAILED DESCRIPTION OF THE PREFERRED EMBODIMENT

Figure 1:
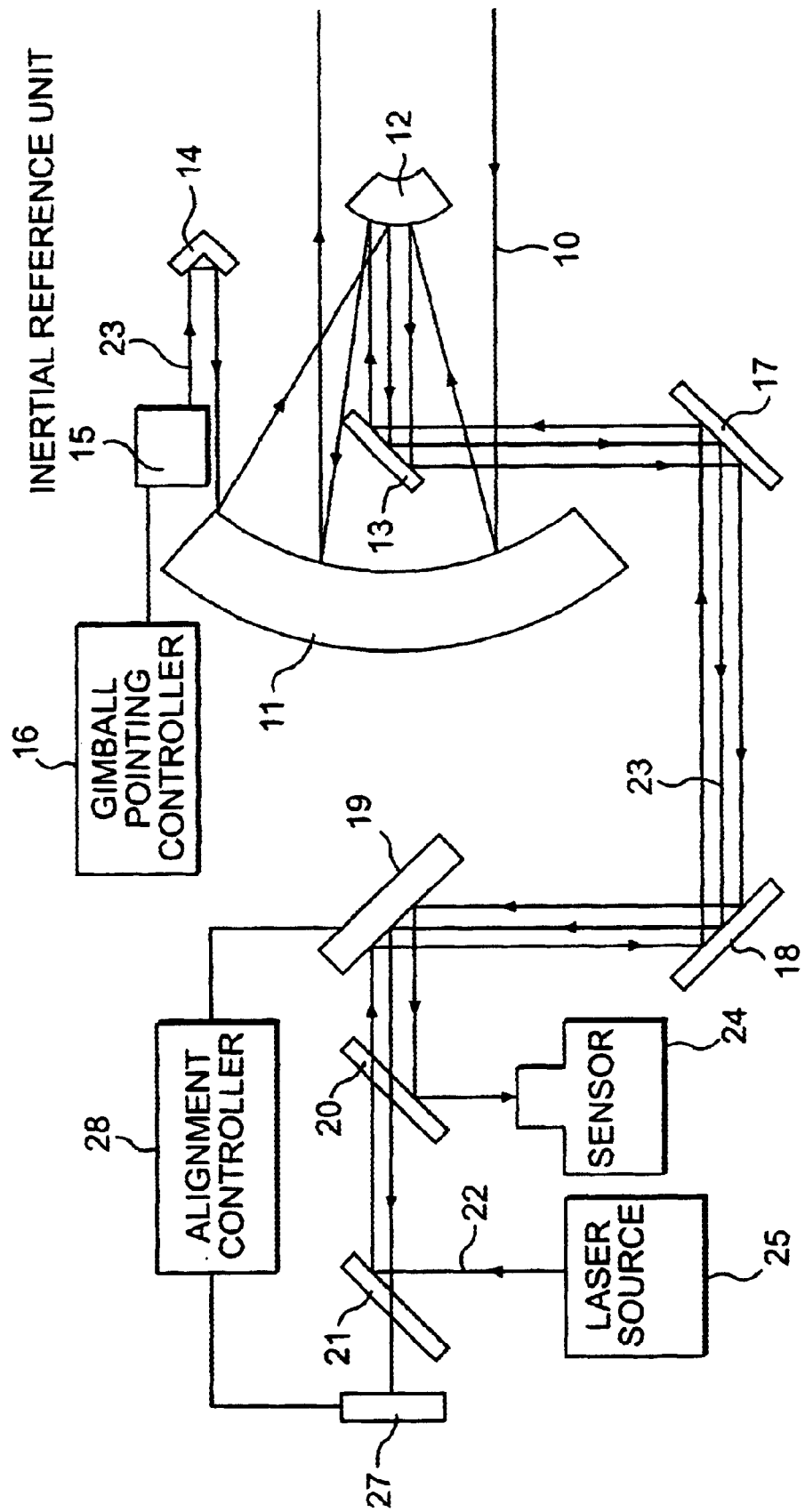
FIG. 1 illustrates a stabilized optical system in accordance with a preferred embodiment of the invention.

Referring now to FIG. 1, an optical system having a stabilized line of sight is disclosed in accordance with a preferred embodiment of the invention. The system includes primary optics comprising a reflector 11 and sub-reflector 12. The primary optics may be used in an imaging system, wherein incoming imaging radiation is received on the reflector 11 and sub-reflector 12, and forwarded via relay optics 13, 17, 18, 19, and 20 to an imaging sensor 24. The system shown can also be implemented as a lasing system, for accurately pointing a laser beam 22 originating from laser source 25. The laser beam 22 is relayed via the relay optical element 21 to the primary optics, and precisely pointed in accordance with the orientation of the primary optics. The primary optics is supported on a gimballed system 16 so that they can be pointed within an arbitrary field of regard.

In either application, a source of image distortion, as well as a pointing error in a lasing system, results from vibrational disturbances incident to the optical system. These disturbances may operate on different parts of the optical system producing different relative displacements with respect to other components of the optical system, disturbing the optical line of sight (LOS) of the system. In these systems, it is important that the optical LOS remain stable, or the quality of the images received, or precision of pointing of the laser beam will be compromised.

In accordance with the present invention, the system is stabilized using an inertial reference unit (IRU) 15 which generates a reference laser beam 23 which is fed into the objective side of the primary optics by extended corner cube 14. The reference laser beam 23 traverses the optical system and is also subject to the same vibrational forces as imaging radiation 10 or pointing beam 22 and experiences jitter with respect to the optical axis of the system. The relative displacement of the reference beam is measured by a two-dimensional optical position detector 27, which is at the end of the optical path for the system. Displacements detected by sensor 27 are used by auto alignment controller 28 to control the position of a jitter rejection mirror 19. Auto alignment controller 28 is a servo mechanism controller which operates to control the servo controlled jitter rejection mirror 19 in a direction to effectively cancel changes in the optical LOS of the system resulting from jitter. The sensor 27 may also be stabilized with its own position stabilizing system. Thus, the reference beam 23, which originates from a positionally stable source 15, produces an accurate measurement on sensor 27 of displacement of the optical LOS of the system, which is used to stabilize the LOS.

The inertial reference unit 15 operates as a reference similar to the way a star may be used in space applications because of its apparent positional stability with respect to Earth. The inertial reference unit 15 is stabilized, with its own auto controlled platform, so that any changes in the beam position with respect to the LOS are due entirely to the jitter induced by external forces operating on the optical system platform.

The attitude of the inertial pointing reference beam 23 is calibrated and initialized in inertial space. Initial reference unit 15 has its own steerable platform and can be commanded to point in any direction in space. The inertial reference unit base is mounted on the primary mirror 11, and the reference beam 23 is aligned to coincide with the mirror's 11 axis. The angle between the platform of the inertial reference unit 15 and its base represents the difference between current and desired optical LOS. The difference can be used as an error signal to control a gimbal pointing controller 16 to drive the optical system supporting the primary optics 11 and 12 to obtain the correct LOS.

The errors in the optical LOS system can be characterized according to their temporal frequency content. The resulting error consists of jitter, bias, and drift. Bias and drift are characteristics representing the best straight line fit to the total position error, and are an indication of the pointing accuracy. The higher frequency error components are jitter, imposed by vibrational forces on the optical system. Jitter can be defined as the standard deviation of the remaining error once bias and drift are subtracted.

Figure 2:
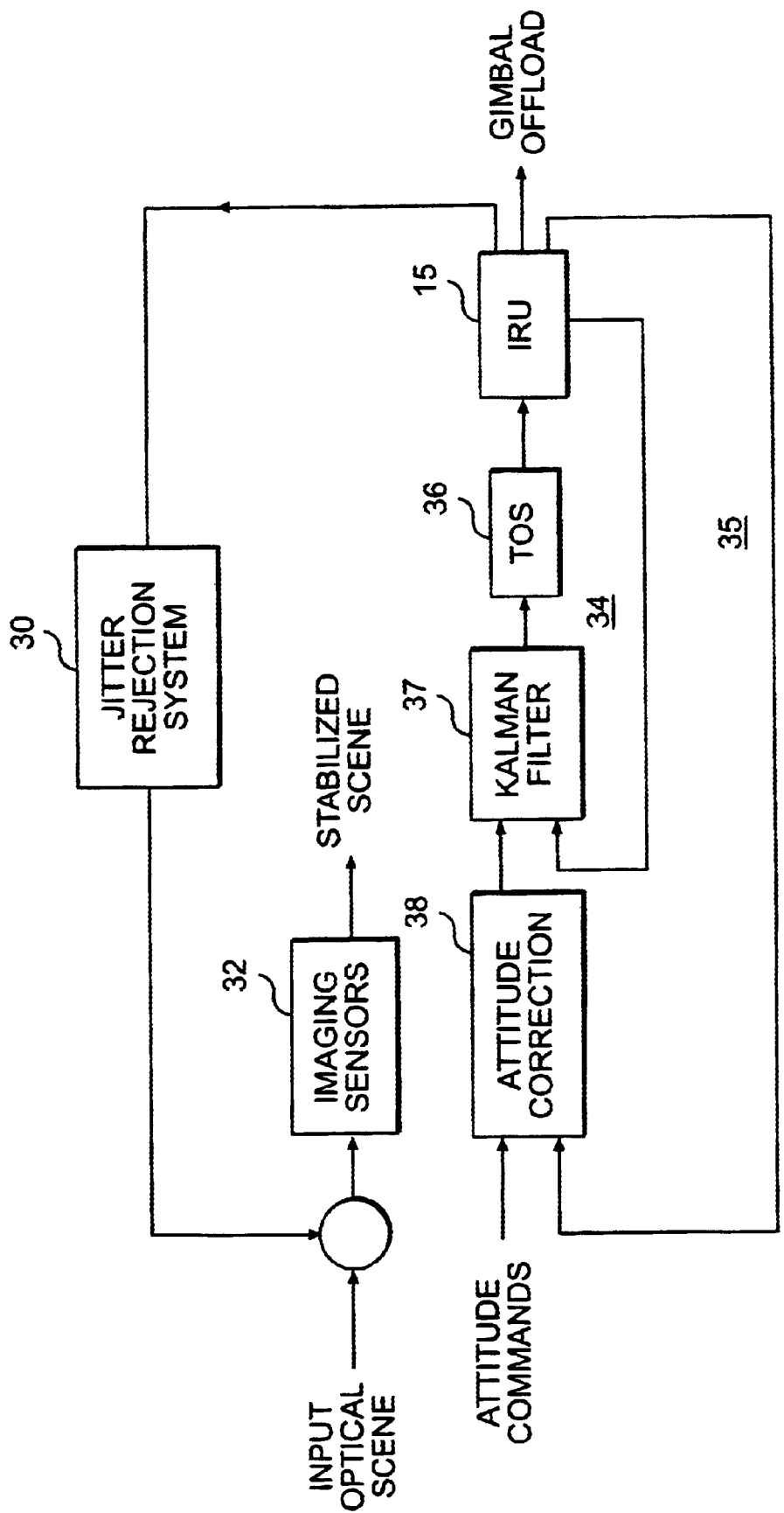
FIG. 2 illustrates the control system used in the stabilized system of FIG. 1.

Referring now to FIG. 2, the control system for stabilizing the optical system of FIG. 1 is shown. The optical input scene received by the camera includes jitter from the relay optics along he optical axis of the system. The jitter rejection system 30 reduces the line or sight fitter to produce a stabilized image scene at the imaging sensor 32. The jitter rejection system 30 includes the jitter rejection mirror 19 and the associated positional components 22, and sensor 27.

The inertial reference unit 15 is stabilized by inertial angular rate detectors, as will be described more particularly with respect to FIGS. 4 and 5. These rate signals are combined with attitude commands in an attitude correction network 38. The corrected attitude for controlling the inertial reference unit 15 position is filtered in Kalman filter 37, and time optimal servo (TOS) 36 provides an inner rate loop 34 within the attitude/line of sight control loop. This results in a correctly pointed and stable inertial reference unit 15. Additionally, the position of the inertial reference unit 15 is used to generate gimbal offload signals, constituting relative angular positions of the inertial reference unit to the gimbal pointing controller 16 of the optical system of FIG. 1, to position the optical system.

Figure 3:
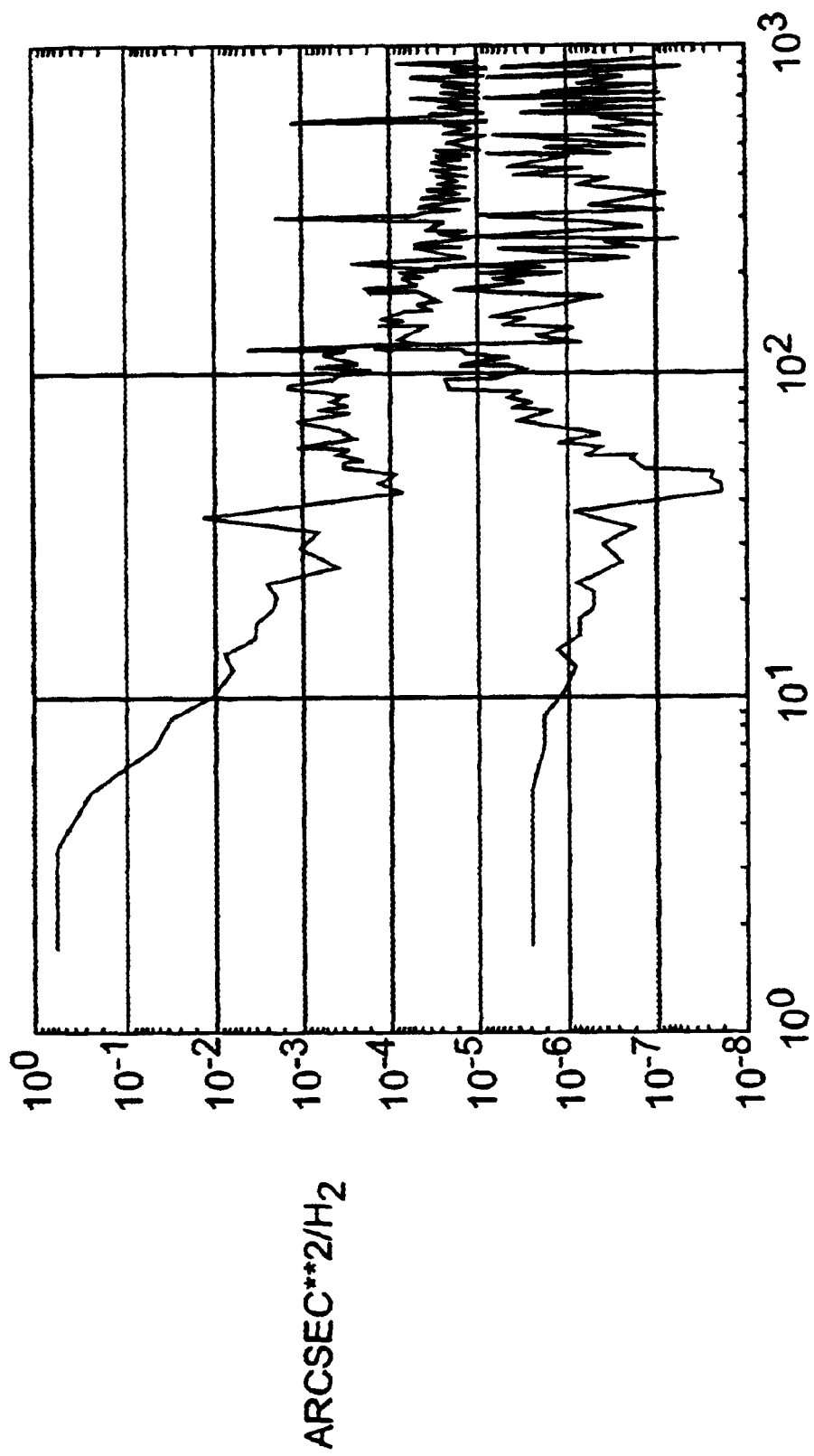
FIG. 3 illustrates the optical jitter correction obtainable using the system of FIG. 1.

By stabilizing the LOS, an improvement in the pointing of the optical instrument is obtained, as is shown more particularly in FIG. 3. FIG. 3 illustrates the optical jitter, arc sec. 2/Hz over the angular frequency bandwidth, with both stabilization, and an unstabilized optical system. The lower curve represents the results of stabilizing the optical system by jitter rejection.

Figure 4A:
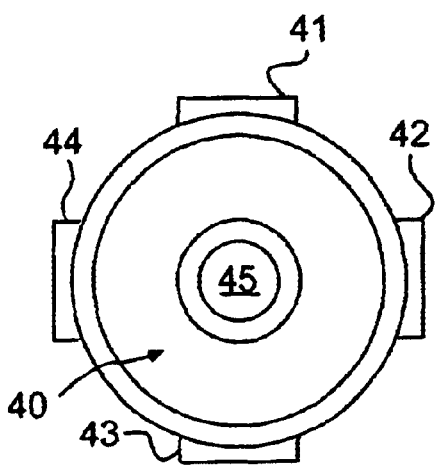
FIG. 4A illustrates the top view of the stabilized inertial reference unit for generating the line of sight reference laser beam.
Figure 4B:
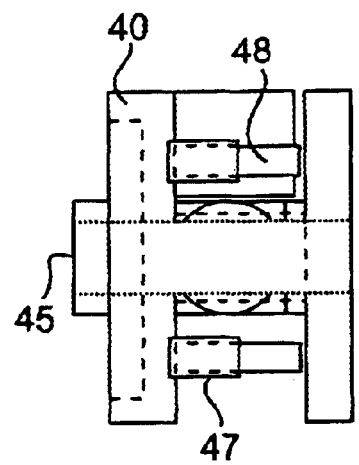
FIG. 4B illustrates the side view of the inertial reference unit.
Figure 4C:
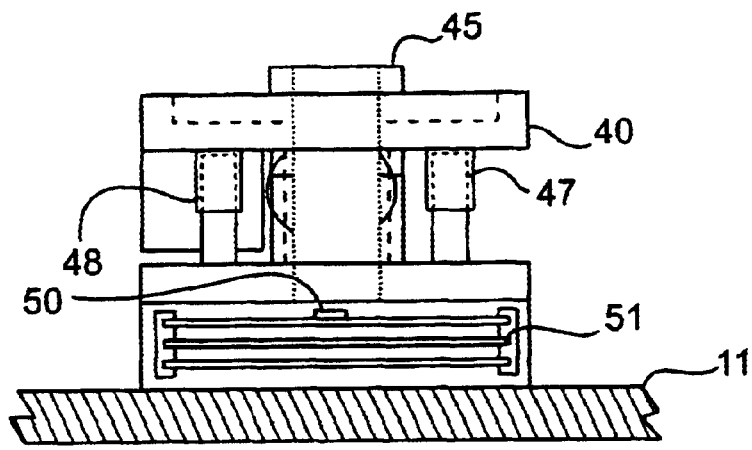
FIG. 4C illustrates the plan view of the inertial reference unit.

FIGS. 4A, 4B, and 4C illustrate the structure used to stabilize the inertial reference unit. The inertial reference unit includes a plurality of sensors 41, 42, 43, and 44 which measure the inertial angular rate of the platform 40. Platform 40, in turn, supports the optical collimator of a laser system having a reference laser source 50. The optical collimator 45 directs the precision beam to the input of the main optical system, where it is used as a reference beam.

The platform is stabilized by a plurality of actuators, two of which, 47 and 48, are shown. As the motion of the stabilized platform are measured via the sensors 41, 42, 43, and 44, the control electronics 51 generate control signals for actuators 47, 48. The actuators 47, 48 include linear displacement sensors which remeasure the relative displacement between platform 40 and the base of inertial reference unit 15. The actuators, in turn, apply forces counter to detected vibrational forces to the platform 40 thereby stabilizing the platform. The platform control system thus formed operates in accordance with the configuration of FIG. 2. The entire structure is supported on the primary optical reflector 11 and is steerable by attitude commands.

The sensors 41–44 for detecting the inertial angular rates of the platform 40 require both a low frequency response as well as a high frequency response. It is contemplated that each sensor 41–44 may comprise two sensors, one of which is designed for measurement of low displacements rates, and the other of which is designed to measure high displacement rates. The output of each pair of sensors can be blended to provide a broad bandwidth detection of the inertial displacements of the platform 40.

The foregoing design provides a two degree of freedom flexure, connecting the stabilized platform to the base of the inertial reference unit 15. This flexure allows for rotation about the tip and tilt axes of the stable platform. It is rigid to all three directions of translations, and to rotation about the optical axis.

Figure 5A:
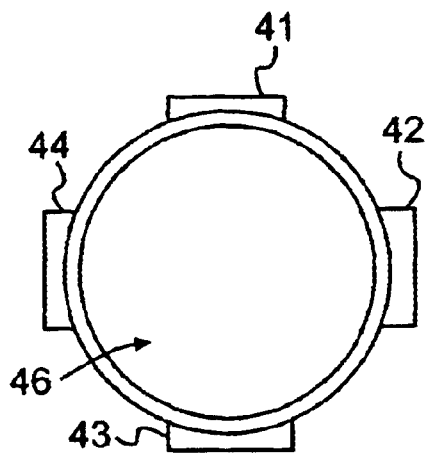
FIG. 5A illustrates the top view of the inertial reference unit having a mirror instead of a stabilized reference laser.
Figure 5B:
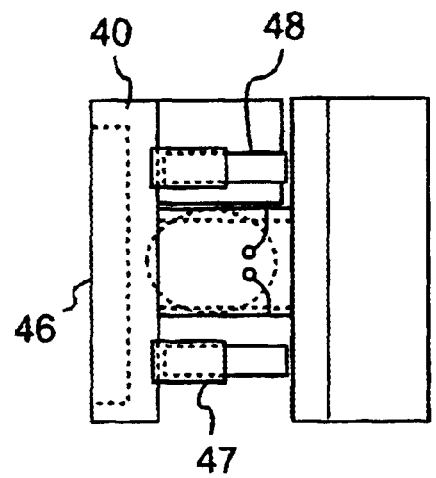
FIG. 5B illustrates the side view of the inertial reference unit.
Figure 5C:
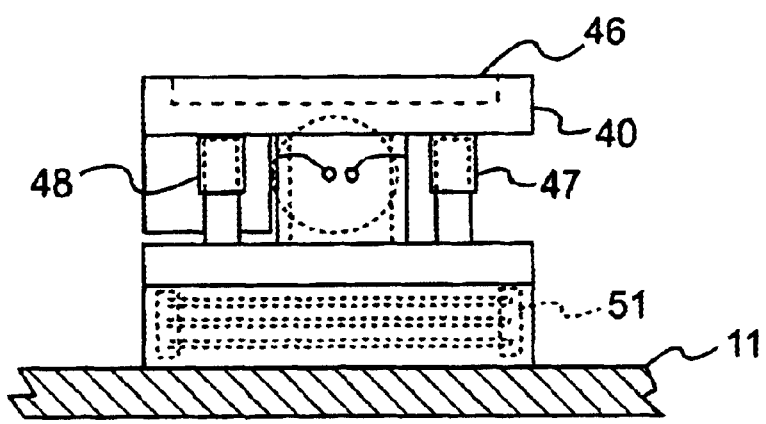
FIG. 5C illustrates the plan view of the inertial reference unit.

FIG. 5 illustrates a second embodiment of generating a reference laser beam using a stabilized mirror. In the embodiment shown, a mirror 46 replaces the collimation optics 45 of FIG. 4. The stabilized platform now constitutes a mirror on which the reference laser can be reflected back to the auto alignment sensor 27.

Figure 6:
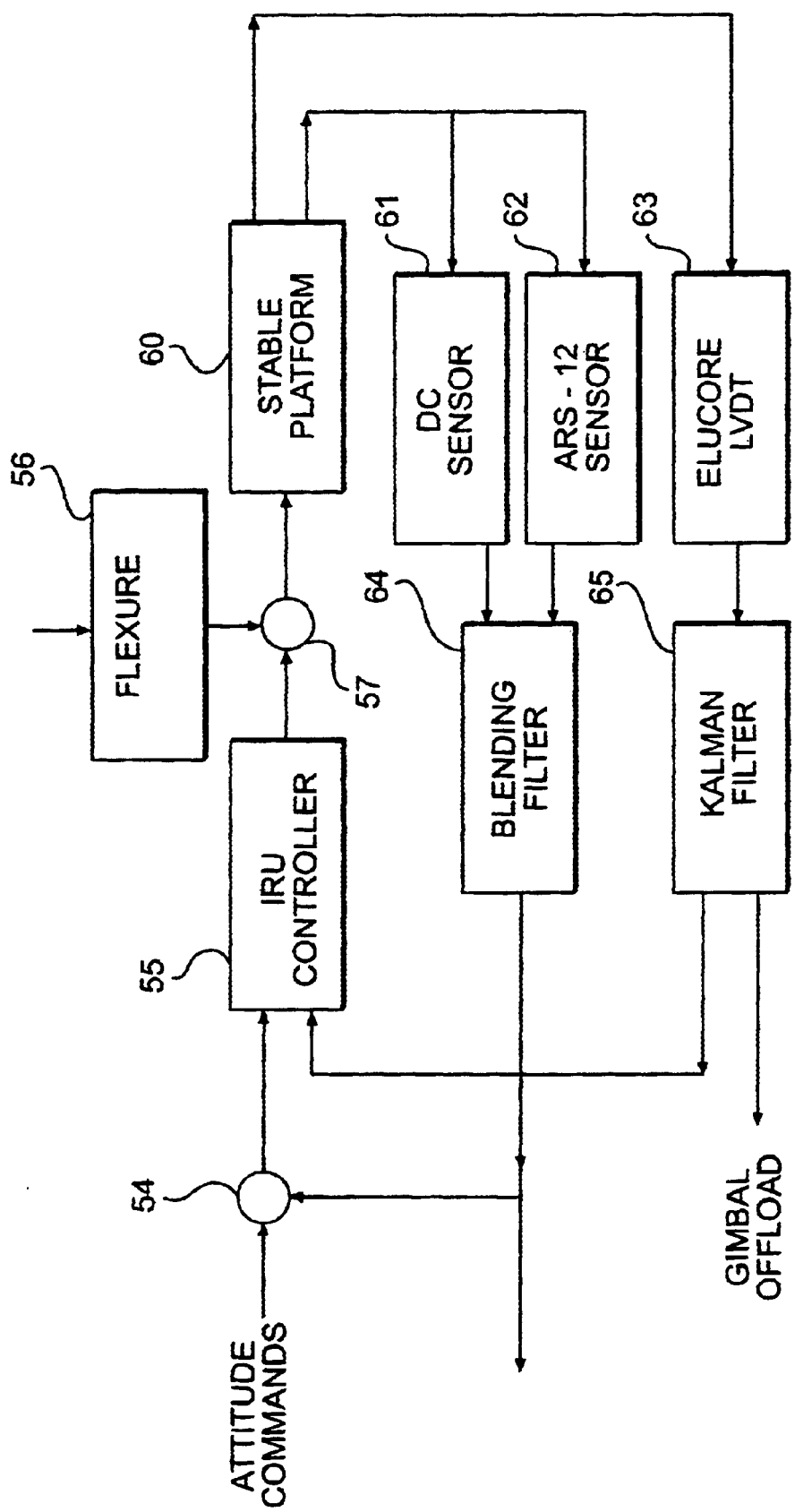
FIG. 6 illustrates a separate control system utilized to stabilize the inertial reference unit.

FIG. 6 is a more detailed illustration of the control system architecture for the inertial reference unit 15. The system includes two control loops so that the stable platform 40 remains motionless in inertial space when attitude commands are zero. It is contemplated that two sensors will be employed, DC sensor 61 and ARS-12 sensor 62 (available from A-Tech Corporation). The two sensors 61, 62 measure the high and low frequency content, respectively, of displacement disturbances incident to the platform 40. Blending filter 64 is shown which blends the output to provide a single error signal representing the disturbance displacements on platform 40. The blending filter 64 output is combined with pointing or attitude commands in a summing junction 54. The inertial reference unit controller 55 then positions the stable platform 60 to assume a position set by the attitude commands, and is stable against the forces 56 as transmitted through the flexure to the platform 40.

An E/U core linear voltage differential transformer sensor (LVDT) 63 is used to measure the position of the stabilized platform relative to the inertial reference unit base. This position error is used to drive the gimbal pointing controller 16 for positioning the base of the optical system to eliminate the error. Thus, the primary optics, as well as the inertial reference unit, assumes the same LOS.

It is also considered possible to implement the inertial reference unit 15 using inertial sensors not mounted on the bottom side of the platform. In this arrangement, the angular rate sensors are mounted to the base. The foregoing strapdown approach generates inertial motion signals which are used to provide the disturbance cancellation on the platform surface.

Figure 7:
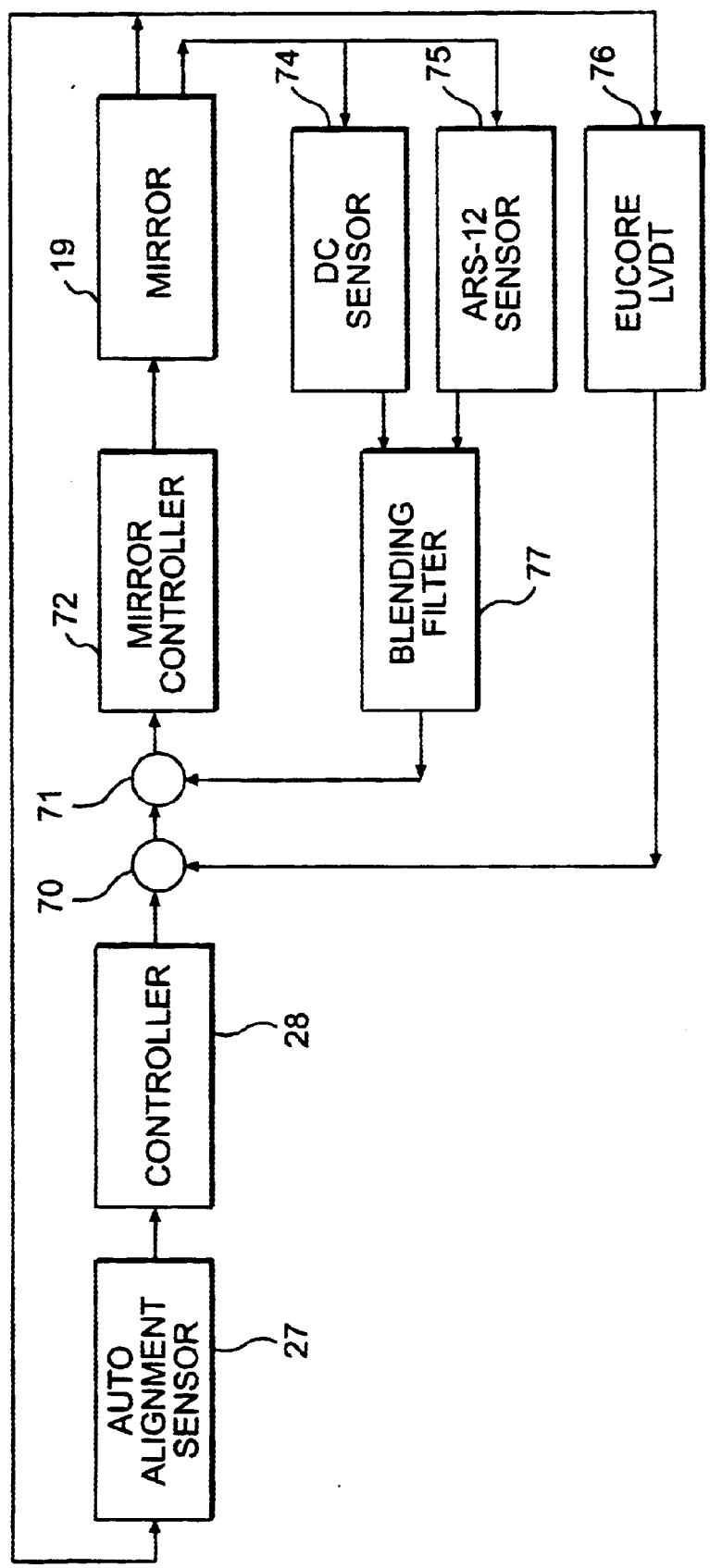
FIG. 7 illustrates the control system for correcting the position of the optical system.

An additional control system is used to control the jitter mirror and its respective control system, as was described with respect to FIG. 1, to compensate for LOS errors. The control system is shown more particularly in FIG. 7. Referring now to FIG. 7, the auto alignment sensors 27 generate a two-dimensional displacement image, representing the position of the reference laser beam. The position is used by controller 28 to generate signals for mirror controller 72. These signals are, in turn, stabilized with feedback signals from the mirror position sensing sensors 74, 75, and 76. As was in the case of the inertial reference unit stabilization system, two sensors 74 and 75 are used to obtain a wide bandwidth detection of mirror displacements. A blending filter 77 combines DC sensor and high frequency sensors 74, 75 outputs to produce the error correction signal for summing junction 71. The system also includes position feedback, from the H/U core LVDT 76. Using both rate feedback, and position feed back, combined in summing junction 70, it is possible to obtain stable control over the mirror position. Mirror 19, as was disclosed with respect to FIG. 1, cancels the disturbances induced on the reference beam 23, in accordance with the signal sensed by the auto alignment sensor 27.

Thus, there has been disclosed with respect to the one embodiment its illustration and description. Additionally, the disclosure shows and describes only the preferred embodiments of the invention, but is to be understood that the invention of capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A system for stabilizing an optical line of sight comprising:

an optical system including primary optics and relay optics;

a jitter rejection mirror located in the path of said relay optics;

a jitter rejection system for maintaining alignment of said jitter rejection minor in response to a control signal;

an auto alignment sensor for detecting jitter in a laser reflecting from said jitter rejection mirror, and generating said control signal for said jitter rejection system for reducing said jitter; and a position stabilized source of reference laser signals which is received at an input of said primary optics and relayed to said jitter rejection mirror and to said auto alignment sensor, whereby an optical system jitter error signal is produced for controlling said jitter rejection system.

2. The system according to claim 1 wherein said stabilized source of laser signals is supported on a gimbaled platform which is controlled to stabilize said source of laser signals.

3. The system according to claim 1 further comprising:

mirror optics for separating an image incident to said jitter rejection mirror from said laser signals incident to said jitter rejection mirror.

4. The system according to claim 1 further comprising:

a source of laser energy directed to said optical system for producing a radiant laser beam which is substantially jitter free.

5. The system according to claim 1 further comprising:

a mirror for separating an image in said relay optics from said reference laser signals; and an imaging sensor positioned to receive an image from said mirror.

6. The system according to claim 1 wherein said primary optics includes a subreflector.

7. The system for stabilizing according to claim 1 wherein said auto alignment sensor senses the deviation of said laser radiation from an optical boresight of said optical system.

8. The system for stabilizing according to claim 1 wherein said auto alignment sensor, jitter rejection mirror and said optical system share a common optical axis.

9. The system for stabilizing according to claim 2 wherein said stabilized source is mounted to the platform containing said optical system, and produces an error signal proportional to the difference between its optical axis and a desired optical axis of said optical system.

10. The system for stabilizing according to claim 9 wherein said, platform containing said optical system is supported on a servo controlled platform and is positionable with respect to said error signal whereby said optical system pointing direction is controlled by the pointing direction of said stabilized source of laser radiation.

* * * * *